United States Patent [19]

McElroy

[11] 3,821,834
[45] July 2, 1974

[54] METHOD OF MAKING AN ULTRASONIC SEARCH UNIT

[75] Inventor: Jerry T. McElroy, Boulder, Colo.

[73] Assignee: Automation Industries, Inc., Century City, Calif.

[22] Filed: July 18, 1972

[21] Appl. No.: 272,807

[52] U.S. Cl................ 29/25.35, 264/111, 264/172, 310/8.2, 310/8.3
[51] Int. Cl............................................. B01j 17/00
[58] Field of Search ............ 29/25.35; 310/8.2, 8.3; 264/111, 272

[56] References Cited
UNITED STATES PATENTS

| | | | |
|---|---|---|---|
| 2,707,755 | 5/1955 | Hardie et al. | 310/8.2 |
| 2,972,068 | 2/1961 | Howry et al. | 310/8.2 |
| 3,403,271 | 9/1968 | Lobdell et al. | 310/8.2 |
| 3,427,481 | 2/1969 | Lenahan et al. | 310/8.2 |
| 3,487,137 | 12/1969 | Kopel | 264/111 |
| 3,546,012 | 12/1970 | Dixon et al. | 310/8.2 X |
| 3,661,146 | 5/1972 | Peronnean et al. | 310/8.2 X |

Primary Examiner—Charles W. Lanham
Assistant Examiner—Carl E. Hall
Attorney, Agent, or Firm—Dan R. Sadler

[57] ABSTRACT

An ultrasonic nondestructive testing system and a search unit for use in such a system are disclosed herein. A method of manufacturing such a search unit is also disclosed. The search unit 10 includes a transducer crystal 36 for transmitting and receiving ultrasonic energy and a backing structure 60 behind the transducer crystal for dampening the crystal 36 against ringing and for attenuating any spurious ultrasonic energy radiated from the backside of the transducer crystal.

6 Claims, 2 Drawing Figures

METHOD OF MAKING AN ULTRASONIC SEARCH UNIT

BACKGROUND

In an ultrasonic nondestructive testing system, one or more search units are provided for transmitting ultrasonic energy into a workpiece in response to a driving signal and for producing electrical signals corresponding to the ultrasonic energy received by the search unit from the workpiece.

In a so-called pulse-echo system the search unit is adapted to transmit bursts or pulses of ultrasonic energy in response to a repetitively occurring driving signal whereby the pulses of ultrasonic energy are propagated into the workpiece. Echoes of the ultrasonic energy are reflected back to the search unit from any discontinuities such as the surfaces of the workpiece, cracks, voids, inclusions, etc. The search unit in turn generates electrical signals corresponding to the received echoes. By measuring the amplitude and time delay of the resultant signals, it is possible to determine the size and position of the discontinuity.

In order to obtain an accurate measurement of the size, position, etc., of a discontinuity, it is necessary to accurately measure the amplitude and time, etc., of the electrical signal generated by the search unit. In order to accomplish this objective, it is highly desirable that the pulses of ultrasonic energy transmitted by the search unit correspond closely to the electrical signal which drives the search unit. Conversely, the electrical signal generated by the search unit should correspond closely to the ultrasonic energy incident on the search unit. Also, the search unit must create very few, if any, spurious signals which might tend to mask a valid signal or be confused with a valid signal.

In addition, it is necessary for the response characteristics of the search unit to be accurately known. In normal commercial inspection operations, it is necessary to frequently change or replace the search units. As a consequence, in order to be commercially successful, it is necessary for all of the search units of a particular type to have substantially identical response characteristics whereby the interchanging of search units will not have a material effect on the operation of the nondestructive testing system.

In a search unit of this type a transducer such as a piezoelectric crystal is used to create the ultrasonic energy in response to the driving signal and conversely to generate an electrical signal in response to the incident ultrasonic energy. Since the crystal physically vibrates it tends to ring (i.e., it vibrates for an extended period of time) after the pulse of ultrasonic energy is transmitted and/or received. These extended vibrations tend to mask and obscure the true signals.

In addition, the transducer crystal tends to radiate substantial amounts of ultrasonic energy from its backside into the interior of the search unit, particularly when it is excited by the driving signal. The spurious energy radiated in a backward direction tends to reflect around the interior of the search unit and return to the crystal. This, in turn, causes the production of spurious signals which tend to mask and obscure the true signals.

Numerous attempts have been made to overcome the foregoing difficulties by providing some form of acoustical dampening structure on the backside of the crystal. For example, reference may be made to U.S. Pat. No. 2,972,068 entitled "UNI-DIRECTIONAL ULTRASONIC TRANSDUCER" filed in the names of Douglas H. Howry and Gerald J. Posakony and assigned of record to Automation Industries, Inc. In order to be effective it is necessary for the dampening structure to be acoustically coupled to the backside of the crystal, have an acoustical impedance which matches the impedance of the crystal, be very "losy" or have a large amount of attenuation, while at the same time not affect the operation of the crystal.

Some of these prior attempts have satisfied one or more of these requirements and have resulted in search units which have been satisfactory for many purposes. However, such search units have had other limitations such as a lack of sensitivity (i.e., the magnitude of the signals generated by the search unit are small), a lack of stability (i.e., the operating characteristics of the search unit change), a lack of ruggedness (i.e., the search unit is frequently damaged by normal operating conditions), a lack of resolution (i.e., inability to distinguish between different signals), the search unit is expensive, it is difficult to manufacture (particularly when the characteristics must closely match preselected parameters), etc., etc.

SUMMARY

The present invention provides means for overcoming the foregoing difficulties. More particularly the present invention includes a search unit and the method of making the same whereby all of the search units have a very high signal-to-noise ratio, a high degree of resolution, lower cost, simple with very few, if any, rejects, high sensitivity, very stable operating characteristics and a rugged construction, etc. In the embodiment disclosed herein this is accomplished by casting or molding an acoustical dampening structure directly onto the backside of the crystal by a very simple and straightforward process. The backing structure is intimately acoustically coupled to the crystal, has an impedance which closely approximates the impedance of the crystal and has a large amount of attenuation.

DRAWINGS

DESCRIPTION

Figure 1:
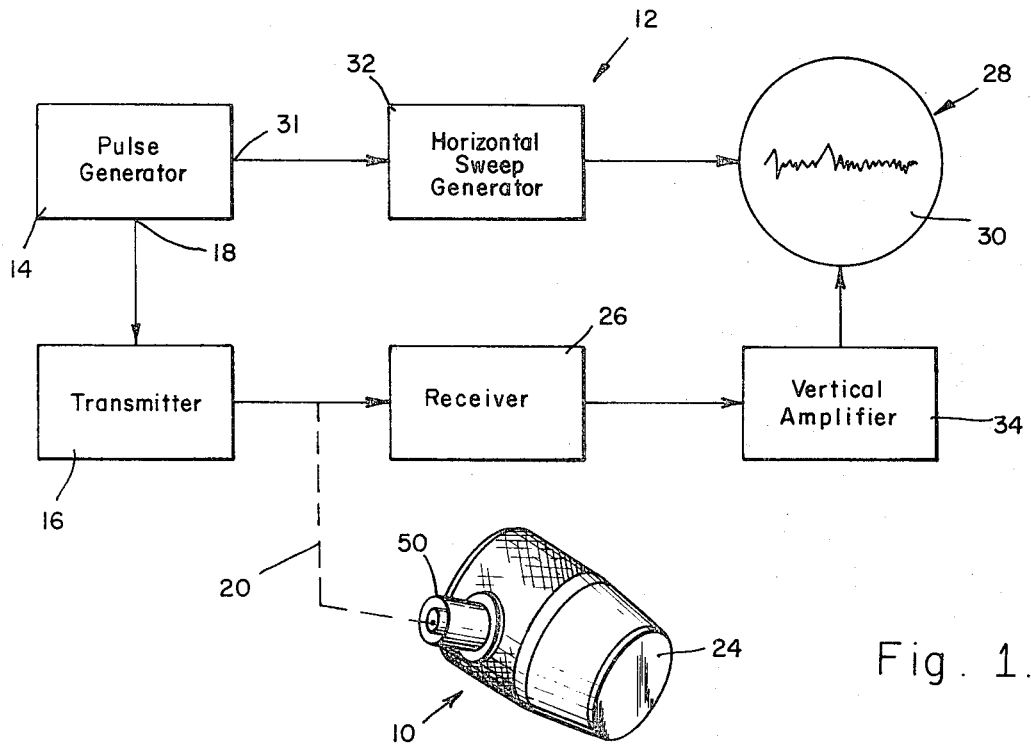
FIG. 1 is a block diagram of a nondestructive testing system employing a search unit embodying the present invention.

Referring to the drawings in more detail, the present invention is particularly adapted to be embodied in an ultrasonic search unit 10 for use in an ultrasonic nondestructive testing system 12. Although the search unit 10 may be employed in any type of ultrasonic nondestructive testing system 12 (i.e., a continuous wave, pulsed, etc.), in the present instance it is shown as being embodied in a so-called pulse-echo system. Moreover, although the search unit 10 may function as just a transmitter or just a receiver, in the present instance it is shown as functioning as a transmitter and receiver.

A typical pulse-echo system 12 is shown in FIG. 1. A pulse generator 14 produces a series of repetitively occurring clock or timing pulses. The clock pulses are effective to determine the repetition rate at which the entire system 12 operates. This repetition rate is not believed to be critical and may vary over a wide range. However, by way of example, it may be in the region of about 1 kilocycle per second.

A pulser or transmitter 16 is coupled to one of the outputs 18 of the pulse generator 14. The transmitter 16 is thereby made responsive to the timing pulses whereby it will operate synchronously therewith. Each time a timing pulse occurs the transmitter 16 produces a pulse suitable for driving the search unit 10. This is normally a high-voltage pulse of a radio frequency in a range of 25 kilocycles to 25 megacycles or higher, for example. The pulse may persist for a single cycle or less. Alternatively, it may include a limited number of cycles, for example five to ten or somewhat more.

The output of the pulser-transmitter 16 is coupled to the search unit 10. Normally this is accomplished by means of a flexible, coaxial cable 20 whereby the search unit 10 may be moved around so as to be coupled to the workpiece 22.

Each time a driving pulse is applied to the search unit 10 it causes a corresponding burst or pulse of ultrasonic energy to be transmitted from the face 24 of the search unit 10. The attenuation of ultrasonic energy in air is very large, especially at the higher frequencies. It is therefore highly desirable to provide a high degree of coupling between the search unit 10 and the workpiece 22.

In the so-called contact form of testing the face 24 of the search unit 10 is placed in direct contact with the workpiece 22. However, it is highly desirable to provide some form of couplant such as a thin film of water, glycerin, etc., between the workpiece and the face 24 of the search unit 10. In immersion testing the search unit 10 and workpiece are normally completely submerged in a water tank. Thus, although the search unit 10 is spaced a substantial distance from the workpiece, it is still acoustically coupled thereto by the water.

In either event the ultrasonic energy is propagated from the face 24 of the search unit 10 and into the workpiece. If there are discontinuities within the workpiece, they act as reflecting surfaces whereby echoes of ultrasonic energy will be returned to the search unit.

Any ultrasonic energy incident on the face 24 of the search unit 10 will cause a corresponding electrical signal to be generated. The resultant electrical signal is coupled back over the coaxial cable 20 into a receiver 26. The receiver 26 is effective to receive or detect the electrical signal.

The output of the receiver 26 is coupled to one or more suitable utilizing or indicating means. Although these may be any of a wide variety, in the present instance, by way of example, an oscilloscope 28 is shown. The oscilloscope 28 includes a cathode ray tube 30 having horizontal and vertical deflection means.

A horizontal sweep generator 32 is coupled to the second output 31 of pulse generator 14 and to the horizontal deflection means. As a consequence, each time a clock pulse occurs, the electron beam is swept horizontally across the face of the cathode ray tube 30.

The output of the receiver 26 is coupled to a vertical deflection amplifier 34. The amplifier 34 in turn is coupled to the vertical deflection means in the cathode ray tube 30.

It may thus be seen that a visual display will be created on the face of the tube 30. The display includes a horizontal trace with one or more vertical marks spaced therealong. These marks correspond to the driving signal originally applied to the search unit 10 and any signals produced by the search unit 10 as a result of its receiving any returning echoes.

The horizontal displacement of the marks along the trace corresponds to the time of reception and therefore is a function of the range or distance of the reflecting target. The amount of the vertical deflection or vertical height of the mark is a function of the magnitude of the echo and is therefore a function of the size of the target.

In order to transmit and receive the ultrasonic energy, the search unit 10 includes an electro-acoustic transducer. This is normally a piezoelectric member or crystal 36. The crystal 36 is normally a flat member of uniform thickness having parallel front and back sides or faces 38 and 40.

It has been found desirable to provide electrodes 42 and 44 to one or both of the faces 38 and 40 of the crystal 36. The electrodes 42 and 44 are normally a very thin film of metal which is vapor deposited, electroplated, etc., onto the faces 38 and 40 of the crystal 36. When an electric potential is applied to the opposite sides or faces 38 and 40 of such a crystal 36, the crystal 36 is physically distorted.

As a consequence of this physical distortion, the crystal 36 vibrates mechanically and radiates such mechanical vibrations (i.e., ultrasonic energy) into the surrounding environment. Conversely, when mechanical vibrations (i.e., ultrasonic energy) are incident upon the crystal 36, electric signals are generated by the crystal 36 between the opposite faces 38 and 40.

As previously stated, when an electrical potential is applied to the opposite faces 38 and 40 of the crystal 36, it vibrates. This causes the desired transmission of ultrasonic energy from the front surface 38 of the crystal 36. However, at the same time it also tends to produce a similar transmission of ultrasonic energy from the backside of the crystal 36.

If the crystal 36 is enclosed in a search unit housing 46, the spurious ultrasonic energy from the backside 40 of the crystal 36 is propagated into the housing 46. If this energy is not dispersed or absorbed, it returns to the crystal 36 and tends to materially interfere with the desired operation of the crystal 36. Also, as previously stated the crystal 36 physically vibrates and tends to "ring" (i.e., continues to vibrate) after the driving signal terminates. If this "ringing" continues, it will also interfere with receiving the ultrasonic energy and the resultant signal.

In order to prevent the spurious ultrasonic energy and ringing from degrading the operation of the search unit 10, it is desirable to provide some form of dampening on the back of the crystal 36. One means of providing such dampening is disclosed and claimed in U.S. Pat. No. 2,972,068, entitled "UNI-DIRECTIONAL ULTRASONIC TRANSDUCER" filed in the names of Douglas H. Howry and Gerald J. Posakony and assigned of record to Automation Industries, Inc. The acoustical dampening tends to absorb and/or dissipate the spurious ultrasonic energy whereby it does not return to the crystal 36. It also dampens the crystal vibrations whereby it does not ring.

Figure 2:
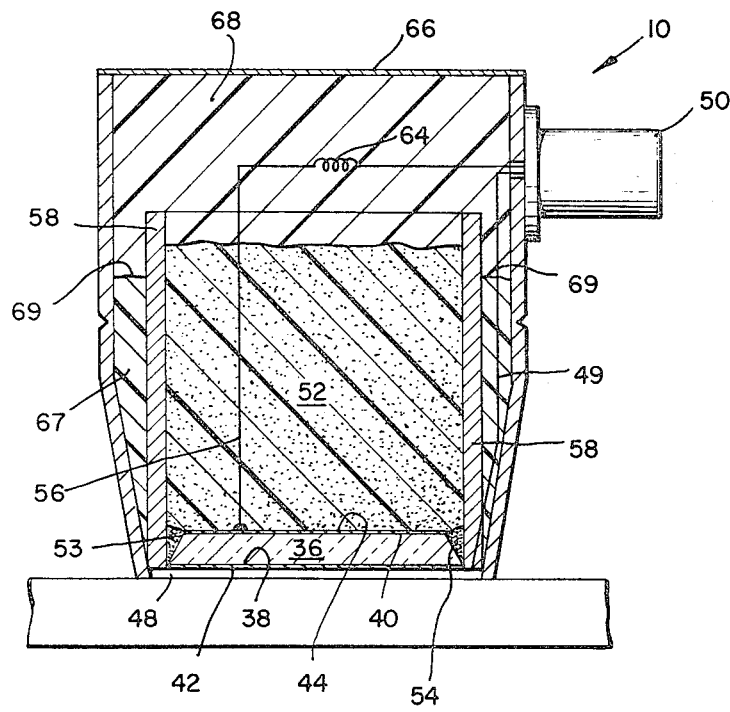
FIG. 2 is a cross-sectional view of the search unit of FIG. 1.

As may be best seen in FIG. 2, all of the various elements of the search unit are sealed inside the protective housing 46. The transducer crystal 36 is mounted so that the front face thereof is disposed almost flush with or very close to the end of the housing 46. It has been found that a piezoelectric crystal of this type and size is a somewhat delicate device and its operating characteristics may be altered if it is damaged. Moreover, if the face of the crystal 36 has an electrode 42 thereof, it may be scratched, worn away, etc.

In order to avoid these and other difficulties, a protective impedance matching device and/or wear plate 48 may be provided on the exterior of the crystal 36. The details of such a device are described more fully in connection with the manufacture of the search unit.

A suitable connector 50 is provided on the exterior of the housing 46 for electrically interconnecting the crystal 36 with the transmitter-receiver. Normally this connector 50 is of a variety suitable for mating with the usual form of connector on the coaxial cable 20.

In addition, the interior of the search unit 10 is provided with an acoustical dampening structure 52. This structure 52 is disposed in direct, intimate contact with the backside 40 of the crystal 36 and is effective to absorb the ultrasonic energy propagated rearwardly from the crystal 36.

The first step in assembling the search unit 10 is to select an appropriate transducer crystal 36. The particular piezoelectric material, the diameter of the crystal 36, the thickness of the crystal 36, etc., are all chosen so as to be appropriate for the frequency, power levels, etc., at which the search unit 10 will operate.

Although the crystal 36 may be of any desired shape, it is normally a flat disc of uniform thickness; i.e., the faces 38 and 40 are planar and parallel. The periphery 54 of the disc may be circular or cylindrical. However, it has been found that certain noise problems which may occur when the crystal 36 operates at the lower frequencies (i.e., below about 2 ¼ megacycles), may be eliminated if the periphery 54 is beveled or chamfered at an angle of about 30°.

The two faces 38 and 40 of the crystal 36 are provided with electrodes 42 and 44. Each of the electrodes 42 and 44 is normally a thin layer of electrically conductive material and may be applied by any suitable means such as bonding a thin film onto the surface with an electrically conductive cement, vapor depositing or electroplating the film onto the crystal, etc.

The surface of the rear electrode 44 (normally the positive one) is preferably lightly buffed with emery, croquis cloth, etc. The grit should be a very fine grit so as to not destroy the electrode 44. The purpose of this step is to improve the adhesion between the electrode surface and the dampening structure 52.

Next, an electrical lead wire 56 may be attached to the rear electrode 44. This is normally accomplished by soldering the wire directly onto the electrode 44. Although the lead wire 56 may be attached at or very near the center of the crystal, it has been found desirable for the connection to be near the edge of the crystal.

The transducer crystal 36 is next rigidly mounted in a liner or inner housing 58. The transducer crystal 36 is preferably positioned in the housing 58 adjacent one end thereof. The face 38 of the crystal 36 is normally flush with the end of the tubular housing 58. The housing 58 is normally formed from an electrically nonconductive material. By way of example, it has been found that a paper base phenolic is very well suited for this purpose.

After the crystal 36 is properly positioned in the housing 58, it is securely fastened in position. This can be accomplished by using a suitable casting or potting compound such as an epoxy resin. The compound should be effective to completely fill all of the space between the periphery 54 of the crystal 36 and the inside of the housing 58. This will hermetically seal the crystal 36 and the housing 58. If there are any air spaces in the seal 53, it is possible an electrical arc discharge may occur in the finished search unit 10.

Considerable care should also be taken to avoid any of the potting compound being present on either of the electrodes 42 or 44 and particularly the rear electrode 44. If any of the potting compound does get on either of the electrodes, it should be carefully removed prior to curing.

After the potting compound forming the seal 53 has fully cured and the crystal 36 is securely fastened and sealed in the end of the tubular housing 58, the dampening structure 52 may be added. The dampening structure 52 includes a binder such as a resin and preferably a heavy metal. All of the prior art search units such as than disclosed in the earlier identified U.S. Pat. No. 2,972,068 have employed a hard, rigid dampening assembly. However, the present binder is somewhat soft and resiliently deformable. By way of example, it has been found that polyurethane resins have the desired characteristics and are well suited for this purpose. In particular, polyurethane resins of the low-foaming variety commonly used for casting and/or potting purposes are generally preferable. Scotchcast Polyurethane Resin No. 221, as sold by Minnesota Mining and Manufacturing Company has been commonly used.

The resin is prepared by adding the catalyst nd completely blending the resultant mixture. This mixing operation should be done carefully so as to avoid any air bubbles, etc., being entrapped in the resin. When the resin is fully mixed it should be of a consistency which is convenient and easy to handle. It has been found that usually it is most convenient for the resin to be sufficiently fluid to allow the binder to be freely poured. However, if for some reason it is preferred, the resin can be somewhat more viscous. In either event, the resin should be suitable to allow it to be worked down into the housing 58 and onto the crystal 36. It should also be sufficiently fluid to avoid the formation of any voids as the housing is being filled.

After the resin binder has been prepared and thoroughly mixed, a heavy metal powder may be added. It has been found that any of the heavy metals such as lead, zinc, iron, crystaline tungsten carbide, etc., are suitable for this purpose. However, for most purposes pure tungsten is preferable. Tungsten provides highly desirable results.

The metal is preferably in the form of a very fine powder. For example, sizes of the particles may be in a range which extends from microscopic up to a maximum of about 5 to 10 microns. Normally, a very substantial proportion, if not all of the particles, are smaller than the above-referenced maximum limit. The exact amount of powdered metal is not believed to be critical. In fact, it has been found that the dampening structure 52 may be just pure binder (i.e., the resin without any powdered metal therein). Such a dampening structure does provide effective dampening and acceptable results for many purposes. However, the binder and powdered metal are usually mixed in a ratio that is somewhere in a range of from about 1:1 up to about 1:10 parts by weight. However, a ratio of about 1 part binder to about 8 parts powder metal (by weight) produces a highly desirable performance.

The powdered metal is thoroughly blended into the binder until it is uniformly dispersed throughout. During the preparation of the binder and the blending of the powdered metal into it, great care should be taken to avoid entrapping and/or mixing any air into the binder.

After the binder and the powdered metal are completely prepared and fully blended, the resultant mixture is loaded into the housing 58. This loading step should be carefully done to insure the mixture being in intimate contact with the rear electrode 44 and to avoid the inclusion or formation of any air bubbles. As stated above, the rear electrode 44 is preferably buffed, cleaned, etc., prior to the loading operation to provide a high degree of adhesion between the electrode and the dampening structure 52.

The exact thickness of the dampening structure 52 (i.e., its height within the housing 58) is not believed to be critical. However, it has been found that the thickness should be greatest at the lower frequencies. For example, in a low-frequency range of about 0.4 to about 2.25 megacycles, the dampening structure 52 should be on the order of at least ¾ inches. However, at the higher frequencies of about 5 to approximately 15 megacycles or higher, it has been found a backing of about ¼ inch is adequate.

After the backing structure formed by the mixture of the binder and powdered metal has been fully loaded into the housing 58, the housing 58 and the mixture therein are vibrated. The duration of this vibration is not believed to be particularly critical and is of a short time such as about 2 minutes. This vibrating action tends to initiate and slightly accelerate the settlement of the powdered metal particles toward the crystal 36.

The amount of settlement of the metal particles is of a very modest magnitude. It should be adequate to slightly increase the concentration of the metal particles immediately adjacent the crystal 36. This, in turn, tends to create a very thin layer of powdered metal immediately adjacent the rear electrode 44. By way of example, this layer of concentrated particles may be on the order of about 0.010 to about 0.015 inches thick. This concentration of particles tends to increase the electrical contact between the backing structure 52 and the rear electrode 44.

Moreover, this layer of concentrated metal improves the acoustical coupling between the crystal 36 and the dampening structure 52. The thin layer of highly concentrated powder metal is immediately adjacent the back surface 40 of the crystal 36. As a result, the metal particles are in the region of maximum vibratile movement. As a consequence, the layer of powdered metal provides a greatly improved acoustic impedance match between the crystal and the dampening structure. This high degree of coupling greatly improves the effectiveness of the dampening action.

After the vibration operation has been completed, the binder is allowed to cure. Normally, the curing is performed in two separate and distinct phases or steps. The first step in the curing operation is to allow the housing 58 to set at "ambient" or "room" temperature. However, the exact temperature is not believed to be critical, but it is perferably in a range which will allow the binder to cure slowly with no foaming or virtually no foaming. It has been found that at "room" temperatures of within a few degrees of 70° F. a low-foaming polyurethane resin can be cured with virtually no foaming occurring.

This initial phase of the curing is allowed to progress for a sufficient period of time to insure the binder being converted into an essentially solid form. More particularly, the binder should be cured to the point where the internal structure of the resin is fairly rigid, i.e., it cannot flow or move around as a result of normal handling or gravity, etc. By way of example, it has been found that a period of about 12 hours is adequate for this purpose.

As indicated above upon the completion of the initial curing phase of setting at room temperature, the curing of the binder is fairly well advanced and the binder is fairly solid. However, the curing process has not been fully completed.

The curing operation may now proceed to the second phase or step. During this phase the backing structure 52 with the partially cured binder is placed in a heated environment and allowed to remain there unitl the curing process is fully completed. By way of example, the structure may be placed in an "oven" and retained at a somewhat elevated temperature.

The exact temperature used during the second phase is not believed to be particularly critical. However, it is normally selected so as to be high enough to produce a tendency to foam. By way of example, when using a low-foaming polyurethane resin it has been found that the temperature may be in the range of about 120° F. Even though the curing of the resin is fairly well advanced at the beginning of the second phase and the resin is fairly rigid at this temperature, there is still a fairly substantial tendency for the resin to foam.

Since the binder is essentially a solid and cannot flow, the mobility of any bubbles formed by the foaming action is virtually nonexistent or at least extremely low. The bubbles tend to remain at essentially the same place where they are initially created. Even though a pair of bubbles may form relatively close to each other, they cannot move around and join together to form a large bubble. This insures the bubbles remaining very small. This is particularly true in view of the fact the curing process if fairly well advanced before the foaming action is allowed to begin.

Normally, the size and distribution of the bubbles is fairly uniform throughout the entire backing structure. However, there is some tendency for the size and distribution of the bubbles to vary slightly in the axial direction of the dampening structure 52. For example, at the bottom of the backing structure 52 and immediately adjacent the crystal 36, the bubbles generally are slightly smaller and somewhat more widely scattered. Conversely, at the opposite end near the top of backing structure 52, the bubbles tend to average somewhat larger in size and somewhat closer together. By way of example, in the region near the crystal, maximum size of the bubbles normally does not exceed about 0.040 inches in diameter.

This second or terminal phase of the curing is continued until the resin is fully cured. The exact time required to complete the full cure is not believed to be critical. However, by way of example, at a temperature of about 120° F. this may require somewhat around 4 hours.

As previously indicated, even at the beginning of this phase the binder is fairly rigid and inflexible. Moreover, backing structure 52 is fully contained within the rigid housing 58 and therefore has a well defined and fixed volume. As a result, when the bubbles form and attempt to expand, a certain amount of internal stress or pressure is created within the dampening structure 52. As a consequence, the size of the bubbles is severely limited and also the dampening structure 52 has a certain amount of permanent internal stress. Among other things these internal stresses assist in maintaining the dampening structure 52 intimately compressed against the back side of the crystal 36.

In addition, upon the completion of the cure the dampening structure 52 has a certain degree of porosity which is substantially uniformly dispersed throughout. This porosity includes the bubbles which result from the foaming action during the second phase. The sizes of the bubbles range from very minute or microscopic up to a maximum size in the range of approximately 0.020 to approximately 0.040 inches. These small bubbles dispersed throughout the dampening structure are very effective in producing a highly desirable scattering and attenuation of any ultrasonic energy coupled into the backing. Also, this action effectively prevents any undesirable reflections of ultrasonic energy from the rear surface of the dampening structure 52.

After the backing material 60 has fully cured, it is desirable to inspect this subassembly to be sure it is operative. In particular it is desirable to confirm that the crystal transducer 36 functions properly and there are not shorts, etc.

If the subassembly is fully operative and meets all of the prescribed criteria, the fabrication of the search unit 10 may be completed. The exact procedure to be followed depends upon the eventual use of the search unit, i.e., whether it is to be of the contact variety or of the immersion variety.

If the search unit is to be of the contact variety as shown in FIG. 2, the front electrode 42 is buffed. This buffing is intended to improve the adhesion of a wear plate to the crystal. Under some circumstances, for example at the higher frequencies of 5 or 10 megacycles, it may be desirable to completely lap the entire electrode 42 from the crystal 36 whereby the entire face 38 is exposed.

A wear plate 48 is next attached to the crystal 36. The wear plate 48 may be of any desired material. It is preferable to use a relatively hard material which can withstand considerable abrasion and wear but will not mar the surface of a test object 22. It should also have suitable acoustical properties, i.e., impedance, etc. It has been found that a high density aluminum oxide is well suited for this purpose.

Usually an electrode is formed on the inner surface of the wear plate 48. This electrode may be a combination of chromium and gold which is vapor deposited onto the wear plate 48. A negative lead wire 49 may be soldered onto this electrode surface.

Following this the electrode surface on the wear plate 48 is coated with a suitable bonding agent such as a low-viscosity epoxy resin. The lead wire 49 is positioned in a clearance opening in the side of the inner housing 58 and the wear plate 48 placed on the crystal transducer 36. It is best to "ring" the wear plate 48 down onto the crystal 36 to insure an effective intimate bonding. When in its final position the wear plate 48 should be concentric with the crystal 36 whereby the edge of the wear plate 48 is flush with the edge of the housing 58.

Once the wear plate 48 is properly positioned on the crystal it should be subjected to a very substantial pressure (i.e., about 25 to 50 lbs.) and the bonding resin allowed to fully cure. After the wear plate 48 has been bonded to the crystal the subassembly is placed inside of the outer housing 46. The exterior surface of the wear plate 48 should be essentially flush with or extend just beyond the end of the housing 46. The subassembly is then prepotted within the outer housing 46. This is accomplished by partially filling the housing 46 with a suitable resin 67 up to the separation line 69. This resin 67 is allowed to substantially cure whereby the position of the inner housing 58 relative to the outer housing 46 is permanently determined.

At this point the partially assembled search unit 10 may be tested to be sure it is fully operative. In addition the capacitance of the assembly should be measured. If desired, a small inductance 64 may be added to the lead 56 and the coupling 50. This will be effective to tune the search unit 10 whereby it will have the desired reactance at the intended operating frequency. In addition the lead wire 58 is connected to the coupling 50.

After this is completed the housing 46 is completely filled from the separation line 69 to the top of the housing 46 with the resin 68. After this resin 68 is fully cured a suitable label, nameplate 66, etc., is then cemented onto the end of the search unit 10.

If the search unit 10 is intended to be of the immersion variety, the assembly procedure is generally the same as described above, except that the wear plate 48 is not used. Instead, after the subassembly has been mounted in the outer housing 46 a suitable lens is cast and/or bonded onto the end of the housing 46 in intimate contact with the crystal transducer 36. This lens is cast from a material having the proper acoustical impedance, etc., for coupling the crystal to the water, etc., used in the immersion bath.

It will thus be seen that a search unit 10 is provided which has a very high degree of dampening and excellent performance. In addition, a very simple process for manufacturing such search units is also provided whereby the search units produced by the process are extremely reliable.

I claim:

1. The method of making an ultrasonic search unit having a piezoelectric transducer crystal therein, including the steps of sealing a piezoelectric transducer in one end of a housing, forming a mixture of a powdered heavy metal and a low-foaming polyurethane resin, substantially filling the housing with said mixture, vibrating the housing with the mixture therein for a sufficient period of time to initiate a partial settling of the powdered metal in said mixture toward the transducer, and partially curing the resin at room temperature and below the foaming temperature until the resin is substantially solid, and fully curing the resin at an elevated temperature above the foaming temperature.

2. The method of claim 1 wherein said forming step includes combining one part resin with up to ten parts metal by weight.

3. The method of claim 2 including vibrating said housing with said mixture therein for an interval that is long enough to initiate a partial settling of the metal particles toward the transducer.

4. The method of making an ultrasonic search unit having a piezoelectric transducer crystal therein including the steps of sealing a piezoelectric transducer in one end of a housing, at least partially filling said housing with a mixture of a polyurethane resin of the low-foaming variety and particles of a heavy metal, at least partially curing the resin at a temperature below the foaming point until the resin is substantially solid, and fully curing the resin at an elevated temperature above said foaming point until the resin is fully cured.

5. The method of claim 4 including combining said resin and metal particles in a ratio of up to ten parts metal to one part resin by weight.

6. The method of claim 5 including vibrating the housing with said mixture therein for an interval which will initiate a partial settling of the metal particles toward the transducer.

* * * * *